(12) United States Patent
Baccouche et al.

(10) Patent No.: US 8,002,337 B2
(45) Date of Patent: Aug. 23, 2011

(54) VEHICLE FRAME WITH OFFSET LOAD PATH TO A HINGE PILLAR AND ROCKER

(75) Inventors: Mohamed R Baccouche, Ann Arbor, MI (US); Timothy Alan Mouch, Troy, MI (US); Viktor Kostrominov, Schererville, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 12/428,853

(22) Filed: Apr. 23, 2009

(65) Prior Publication Data

US 2010/0270828 A1 Oct. 28, 2010

(51) Int. Cl.
B62D 25/08 (2006.01)
(52) U.S. Cl. .............................. 296/203.02; 296/187.09
(58) Field of Classification Search ............. 296/187.01, 296/187.03, 187.09, 187.1, 187.12, 193.01, 296/193.05, 193.06, 193.09, 203.01, 205, 296/203.02, 203.03, 29, 30
See application file for complete search history.

(56) References Cited

U.S. PATENT DOCUMENTS

| | | | |
|---|---|---|---|
| 4,545,612 A * | 10/1985 | Harasaki | 296/203.02 |
| 4,550,948 A | 11/1985 | Hamada et al. | |
| 4,944,553 A | 7/1990 | Medley et al. | |
| 5,303,973 A * | 4/1994 | Fujii | 296/203.02 |
| 5,944,377 A * | 8/1999 | Vlahovic | 296/204 |
| 6,217,109 B1 | 4/2001 | Okana et al. | |
| 6,299,237 B1 * | 10/2001 | Benz et al. | 296/187.09 |
| 6,332,643 B1 | 12/2001 | Sukegawa et al. | |
| 6,447,052 B2 | 9/2002 | Saeki | |
| 6,533,348 B1 | 3/2003 | Jaekel et al. | |
| 6,644,725 B2 | 11/2003 | Braitmaier et al. | |
| 6,648,404 B2 * | 11/2003 | Yakata et al. | 296/209 |
| 6,705,670 B2 * | 3/2004 | Forssell et al. | 296/187.09 |
| 6,808,228 B1 * | 10/2004 | Leanza et al. | 296/193.02 |
| 6,988,763 B2 | 1/2006 | Saeki | |
| 7,090,273 B2 * | 8/2006 | Stojkovic et al. | 296/29 |
| 7,140,674 B2 * | 11/2006 | Miyoshi et al. | 296/203.03 |
| 7,267,394 B1 * | 9/2007 | Mouch et al. | 296/203.02 |
| 7,347,491 B2 * | 3/2008 | Mouch et al. | 296/209 |
| 2005/0012362 A1 * | 1/2005 | Patberg et al. | 296/203.01 |
| 2008/0265623 A1 * | 10/2008 | Kiyotake et al. | 296/187.09 |
| 2010/0171340 A1 * | 7/2010 | Yasuhara et al. | 296/205 |

FOREIGN PATENT DOCUMENTS

| | | |
|---|---|---|
| JP | 2000016334 A | 1/2000 |
| JP | 2006035878 A | 2/2006 |

* cited by examiner

*Primary Examiner* — Dennis H Pedder
(74) *Attorney, Agent, or Firm* — Frederick Owens; Brooks Kushman P.C.

(57) ABSTRACT

A vehicle frame sub-assembly including a hinge pillar assembly and A-pillar assembly. A high strength hinge pillar reinforcement and A-pillar reinforcement are provided to increase the support in roof crush tests. Collision impact loads are transferred through an upper load path, lower load path, upper intermediate load path, and lower intermediate load path. A back-up rail receives loads from the front rail. The back-up rail transfers loads to the rocker and through a back-up rail extension to the hinge pillar assembly. An upper intermediate load path transfers loads from the upper rail through a fork rail to the hinge pillar assembly.

14 Claims, 2 Drawing Sheets

VEHICLE FRAME WITH OFFSET LOAD PATH TO A HINGE PILLAR AND ROCKER

BACKGROUND

1. Field of the Invention

The present invention relates to front end collision load paths defined by the vehicle frame and other support structures.

2. Background Art

Hinge pillars are the part of a vehicle to which vehicle doors are attached by hinges. Hinge pillars do not normally provide the primary support for the front end structure in the event of a front end collision. The primary support for the front end structure is provided by frame members that define a lower load path and an upper load path.

The lower load path and upper load path are defined by the vehicle frame for analysis of collision energy management and the development of passenger compartment intrusion maps. Intrusion maps simulate vehicle energy absorption in response to collision loads. The upper load path transfers forces to the upper structure of the vehicle that includes the roof structure. The lower load path transfers forces to the lower vehicle structure that includes the rocker.

Roof structures are being developed to meet higher proposed roof crush strength that require the roof structure to be able to support four times the unloaded vehicle weight. One of the changes in vehicle design is to strengthen the A-pillar and hinge pillar joint by forming the cowl side inner panel and hinge pillar from a high strength steel alloy. By strengthening the cowl side inner panel and hinge pillar, roof crush loads are transferred from the A-pillar to the cowl side inner panel and the hinge pillar.

Intrusion into the passenger compartment is monitored at predetermined locations on a vehicle. In a crash test, points located at various locations around the passenger compartment are monitored to analyze crash energy management and to develop intrusion maps. For front end collisions, intrusions are measured at the hinge pillar and are limited to 50 mm. The hinge pillar is located adjacent the instrument panel that is also measured on intrusion maps. Loads transferred to the upper load path are not monitored because they do not generally result in passenger compartment intrusion. In prior art vehicles, application of loads to the hinge pillar area was normally avoided or minimized to reduce intrusion into the passenger compartment.

A front rail extends from the vehicle bumper to the back-up rail that links the front rail to the rocker. The front rail is offset from the rocker and loads applied during a front end collision result in a bending moment located where the back-up rail is connected to the front end of the rocker. The bending moment reduces vehicle energy absorption and may adversely impact intrusion map performance.

There is a need for an improved vehicle frame that enhances intrusion map performance without substantially increasing the weight of the components required for front end collision energy management.

SUMMARY

According to one aspect of the disclosure, an improved crash energy management load path is provided that utilizes a reinforced A-pillar/hinge pillar having high strength properties required for increased roof crush strength requirements. The high strength reinforced hinge pillar and high strength cowl side inner panel provide a generally vertical link between the lower load path that includes the rocker and the upper load path that includes the roof structure of a vehicle.

According to another aspect of the disclosure, the reinforced hinge pillar and reinforced lower cowl side inner panel are joined together to form a box channel frame. The reinforced hinge pillar and cowl side inner panel are secured to the lower end of the A-pillar. The boxed cowl side inner panel and hinge pillar overlap on the front tip of the rocker.

To increase energy absorption by the back-up rail and improve intrusion map performance, an extension may be provided that is secured to the back up rail and the hinge pillar at a location above the rocker. In addition, forces transmitted along the upper load path may be divided by a fork or other structure to provide a structural load path from the upper rail to the hinge pillar and cowl side inner panel. The reinforced hinge pillar and cowl side inner panel can be tied to the upper front rail and lower front rail to provide a more robust load path for offset loads and also to accommodate multiple load paths.

These and other aspects of the invention will be better understood in view of the attached drawings and the following detailed description thereof.

DETAILED DESCRIPTION

Figure 1:
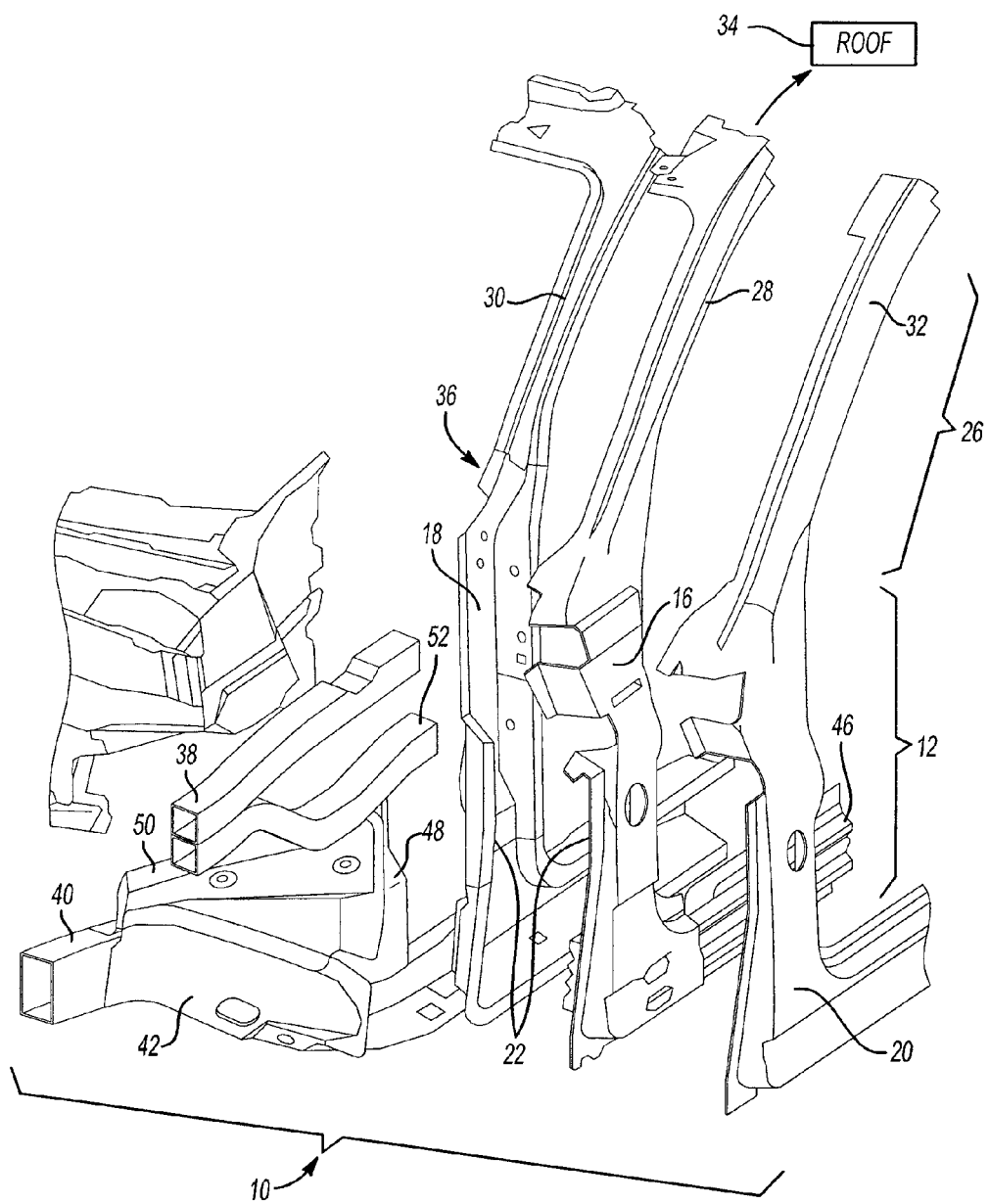
FIG. 1 is an exploded perspective view of a vehicle frame sub-assembly made according to the present invention.

Referring to FIG. 1, a vehicle frame sub-assembly 10 is shown in an exploded perspective view. The vehicle frame sub-assembly 10 includes a hinge pillar assembly 12. The hinge pillar assembly 12 includes a hinge pillar reinforcement 16 that is attached on its inside to a cowl side inner panel 18. An outer hinge pillar panel 20 is attached over the outer side of the hinge pillar reinforcement 16. The hinge pillar reinforcement 16 and the cowl side inner panel 18 together form a box channel 22. The hinge pillar reinforcement 16 and cowl side inner panel 18 are preferably formed of a dual phase material, such as DP-600, which is a dual phase martensitic steel alloy.

An A-pillar assembly 26 includes an A-pillar reinforcement 28 that is attached on its inner side to an A-pillar cowl side inner panel 30. An outer A-pillar panel 32 is assembled over the outer side of the A-pillar reinforcement 28 to complete the A-pillar assembly 26. The A-pillar assembly 26 is connected on its upper end to a roof that is diagrammatically shown in FIG. 1 and identified by reference numeral 34.

An upper portion 36 of the hinge pillar assembly 16 is attached to the A-pillar assembly 26. An upper rail 38 is assembled to the upper portion 36 of the hinge pillar assembly 16. A front rail 40 is connected through a back-up rail 42 to a rocker 46. A back-up rail extension 48 is assembled to the upper portion of the back-up rail 42 and is also assembled to the hinge pillar assembly 12. The back-up rail extension 48 preferably defines a box channel section 50 that adds strength to the back-up rail extension 48.

A fork rail 52 may be attached to the upper rail 38 and the hinge pillar assembly 12.

Figure 2:
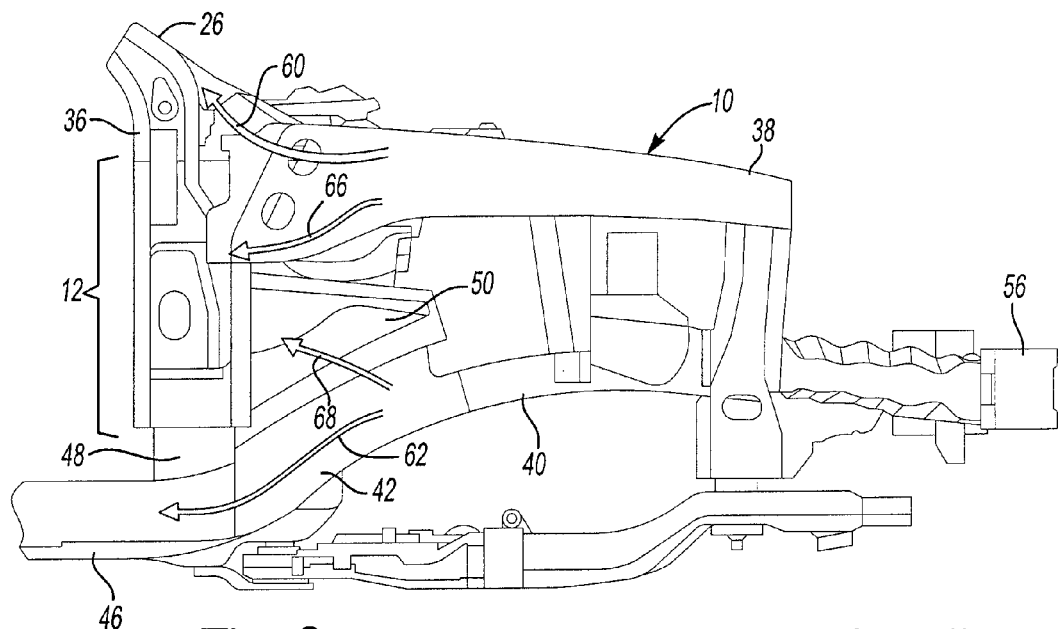
FIG. 2 is a side elevation view of the vehicle frame sub-assembly.

Referring to FIG. 2, the vehicle frame sub-assembly 10 is shown assembled together to a bumper 56. The vehicle frame sub-assembly 10 includes the hinge pillar assembly 12, A-pillar assembly 26 and rocker 46. An upper load path is illustrated by arrow 60. The upper load path 60 transfers collision impact loads through the upper rail 38 and to the upper portion 36 of the hinge pillar assembly 12. A lower load path illustrated by arrow 62 transfers collision impact loads from the bumper 56 to the front rail 40. Loads applied to the front rail 40 are in turn applied to the back-up rail 42 and in turn to the rocker 46. An upper intermediate load path is shown diagrammatically by arrow 66. The upper intermediate load path 66 transfers loads from the upper rail 38 through the fork rail 52 (shown in FIG. 1) to the hinge pillar assembly 12.

A lower intermediate load path is shown by arrow 68. The lower intermediate load path transfers collision impact loads from the front rail 40 and back-up rail 42 through the back-up rail extension 48 to the hinge pillar assembly 12.

The intermediate load paths 66, 68 provide load paths that spread collision impact loads to three or four different portions of the hinge pillar assembly 12. The increased strength of the box channel 22 formed by the cowl side inner panel 18 and the hinge pillar reinforcement 16, and particularly when formed with a DP-600 alloy for roof crush strength purposes, provides a more robust vehicle frame sub-assembly 10 that is effective to increase energy absorption and improve the results of intrusion map testing.

Figure 3:
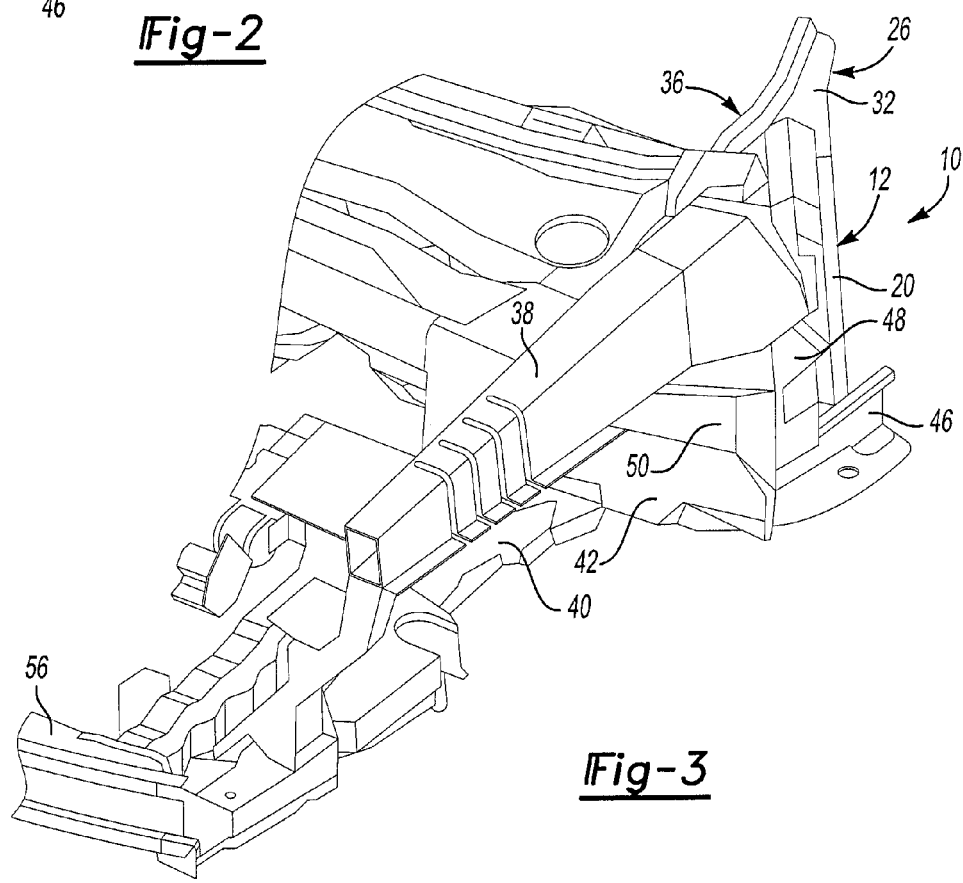
FIG. 3 is a front side perspective view of the vehicle frame sub-assembly.

Referring to FIG. 3, the vehicle frame sub-assembly 10 is shown in perspective. The vehicle frame sub-assembly 10 includes the hinge pillar assembly 12. The outer hinge pillar panel 20 is shown in FIG. 3. The A-pillar assembly 26 is attached to the upper end 36 of the hinge pillar assembly 12. The outer A-pillar panel 32 is the portion of the A-pillar assembly 26 that is visible in FIG. 3.

In the event of a front end collision, the bumper 56 initially receives the collision impact load which is transferred through the front rail 40 to the back-up rail 42. Loads applied to the back-up rail 42 are transferred to the rocker 46 and the hinge pillar assembly 12 through the back-up rail extension 48. The box channel section 50 permits the back-up rail extension 48 to transfer increased loads to the hinge pillar assembly 12 while improving the results of intrusion map testing. Other loads from a front end collision impact are transferred through the upper rail 38 to the hinge pillar and to a spaced location by the upper rail 38 and fork rail 52 that are not visible in FIG. 3, but are shown in FIG. 1.

While the best mode for carrying out the invention has been described in detail, those familiar with the art to which this invention relates will recognize various alternative designs and embodiments for practicing the invention as defined by the following claims.

What is claimed is:

1. A vehicle frame sub-assembly comprising:
   a hinge pillar assembly including a hinge pillar reinforcement, a cowl side inner panel, and an outer hinge pillar panel, wherein the hinge pillar reinforcement and the cowl side inner panel are assembled together to define a vertically extending back-up rail extension,
   an A-pillar assembly including an A-pillar reinforcement, an A-pillar side inner panel, and an outer A-pillar panel, the A-pillar assembly being assembled to an upper portion of the hinge pillar assembly;
   an upper rail extending in a longitudinal vehicle direction and being attached to the A-pillar assembly and the upper portion of the hinge pillar assembly, wherein the upper rail is part of an upper load path;
   a front rail extending from a bumper to a back-up rail, the back-up rail extending from a back portion of the front rail in an outboard vehicle direction to a rocker, wherein the front rail, back-up rail, and rocker define a lower load path; and
   wherein the upper load path and lower load path are joined by the box channel and a back-up rail extension that is assembled between the back-up rail and the vertically extending box channel of the hinge pillar assembly, wherein a box channel section is assembled to the back-up rail and to the box channel to define a lower intermediate load path to the box channel.

2. The vehicle frame sub-assembly of claim 1 further comprising a fork rail that is assembled between the upper rail and the box channel.

3. The vehicle frame sub-assembly of claim 1 wherein a second extension rail is a fork rail that is assembled between the upper rail and the box channel that also defines an upper intermediate load path to the box channel.

4. The vehicle frame sub-assembly of claim 1 wherein a front end collision load is applied through the upper load path, the lower load path, an upper intermediate load path through a fork rail and the lower intermediate load path through the box channel section and the back-up rail extension.

5. The vehicle frame sub-assembly of claim 1 wherein the back-up rail extension that is assembled between the back-up rail and the box channel defines a box channel section.

6. A vehicle frame sub-assembly comprising:
   a hinge pillar assembly including a hinge pillar reinforcement, a cowl side inner panel, and an outer hinge pillar panel, wherein the hinge pillar reinforcement and the cowl side inner panel are formed from a dual phase martensitic steel and are assembled together;
   an A-pillar assembly including an A-pillar reinforcement, an A-pillar inner panel, and an outer A-pillar panel, the A-pillar assembly being assembled to an upper portion of the hinge pillar assembly;
   an upper rail extending in a longitudinal vehicle direction and being attached to the A-pillar assembly and the upper portion of the hinge pillar assembly, wherein the upper rail is part of an upper load path;
   a front rail extending from a bumper to a back-up rail, the back-up rail extending from a back portion of the front rail in an outboard vehicle direction to a rocker, wherein the front rail, back-up rail, and rocker define a lower load path; and
   wherein the upper load path and lower load path are joined by the hinge pillar assembly that provides a vertically extending beam to which a back-up rail extension and a box channel section are assembled between the back-up rail and the hinge pillar assembly to define an intermediate load path that is applied to an intermediate portion of the hinge pillar assembly.

7. The vehicle frame sub-assembly of claim 6 wherein a second extension rail is a fork rail that is assembled between the upper rail and the hinge pillar assembly.

8. The vehicle frame sub-assembly of claim 7 wherein the second extension rail defines an upper intermediate load path to the hinge pillar assembly.

9. The vehicle frame sub-assembly of claim 6 wherein a front end collision load is applied through the upper load path, the lower load path, an upper intermediate load path through the fork rail and a lower intermediate load path through the back-up rail extension.

10. The vehicle frame sub-assembly of claim 6 wherein the back-up rail extension defines a hinge pillar assembly section.

11. A vehicle frame sub-assembly comprising:
   a hinge pillar assembly including a hinge pillar reinforcement, a cowl side inner panel, and an outer hinge pillar panel, wherein the hinge pillar reinforcement and the cowl side inner panel are assembled together to define a vertically extending frame member;

an A-pillar assembly including an A-pillar reinforcement, an A-pillar inner panel, and an outer A-pillar panel, the A-pillar assembly being assembled between a roof and an upper portion of the hinge pillar assembly;

a front rail extending from a bumper to a back-up rail, the back-up rail extending from a back portion of the front rail in an outboard vehicle direction to a rocker, wherein the front rail, back-up rail, and rocker define a lower load path; and wherein the lower load path is joined to the vertically extending frame member by a back-up rail extension and a box channel section that are assembled to the back-up rail to define a lower intermediate load path.

12. The vehicle frame sub-assembly of claim 11 wherein a front end collision load is applied through the lower load path, and the lower intermediate load path through the back-up rail extension.

13. The vehicle frame sub-assembly of claim 11 wherein the back-up rail extension defines a box channel section.

14. The vehicle frame sub-assembly of claim 11 wherein the vertically extending frame member defines a box channel that is defined by the hinge pillar reinforcement and the cowl side inner panel.

* * * * *